United States Patent
Ha et al.

(10) Patent No.: US 8,165,213 B2
(45) Date of Patent: Apr. 24, 2012

(54) FRAME CONVERSION APPARATUS AND METHOD, AND FRAME TYPE DETECTION APPARATUS AND METHOD

(75) Inventors: Seong-Jong Ha, Namyangju-si (KR); Nam-Ik Cho, Seoul (KR); Sang-Hwa Lee, Seoul (KR)

(73) Assignees: Seoul National University Industry Foundation, Seoul (KR); Samsung Electronics Co., Ltd., Gyeonggi-do (KR)

( * ) Notice: Subject to any disclaimer, the term of this patent is extended or adjusted under 35 U.S.C. 154(b) by 1615 days.

(21) Appl. No.: 11/525,027

(22) Filed: Sep. 22, 2006

(65) Prior Publication Data

US 2008/0031318 A1 Feb. 7, 2008

(30) Foreign Application Priority Data

Aug. 3, 2006 (KR) .................. 10-2006-0073259

(51) Int. Cl.
*H04B 1/66* (2006.01)
*H04N 7/12* (2006.01)
*H04N 11/02* (2006.01)
*H04N 11/04* (2006.01)

(52) U.S. Cl. .................. 375/240.2; 375/240.24

(58) Field of Classification Search .................. None
See application file for complete search history.

(56) References Cited

U.S. PATENT DOCUMENTS

| 7,031,385 B1* | 4/2006 | Inoue et al. ............... 375/240.08 |
| 2002/0101924 A1* | 8/2002 | Suzuki et al. ............... 375/240.2 |
| 2006/0109899 A1* | 5/2006 | Kablotsky ............... 375/240.01 |

FOREIGN PATENT DOCUMENTS

| JP | 2000-217084 | 8/2000 |
| JP | 2005-223503 | 8/2005 |
| KR | 10-2004-0110922 | 12/2004 |
| KR | 10-0495260 | 6/2005 |

* cited by examiner

*Primary Examiner* — Christopher S Kelley
*Assistant Examiner* — Thoai Nguyen
(74) *Attorney, Agent, or Firm* — Harness, Dickey & Pierce, P.L.C.

(57) ABSTRACT

Provided are a frame conversion apparatus and method and a frame type detecting apparatus and method. The frame conversion apparatus may include a detecting unit and an inverse telecine unit. The detecting unit may determine that each data frame is a telecine frame or a progressive frame according to the rate of discrete cosine transform (DCT) operation type performed on macro blocks of the frame or the number of the macro blocks on which each type of DCT operation is performed and output frame type information. The inverse telecine unit may convert the data frames into progressive frames and output the progressive frames in response to the frame type information.

13 Claims, 6 Drawing Sheets

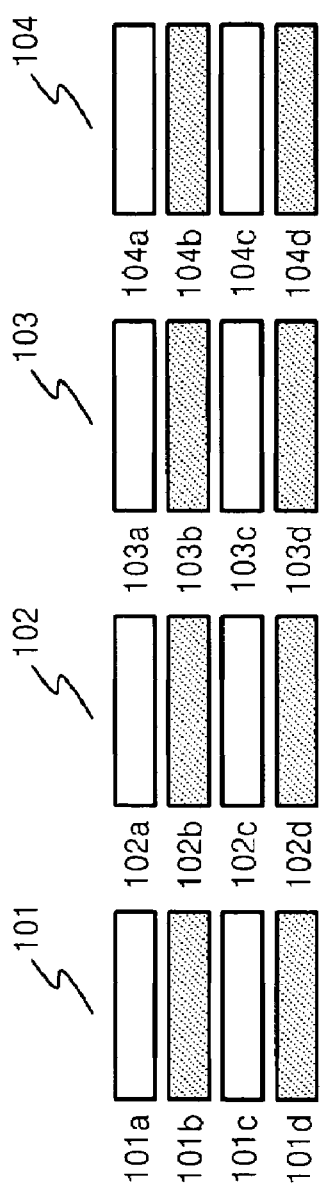
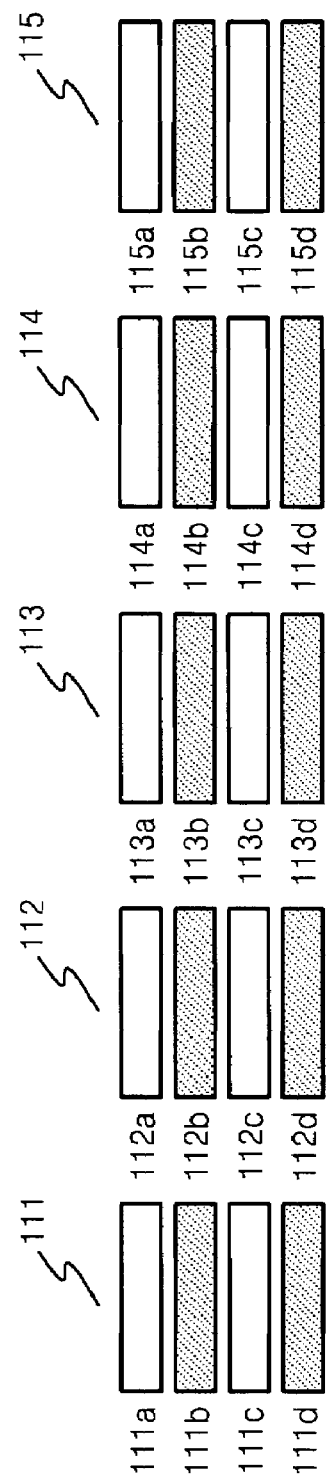
FIG. 1A
FIG. 1B

FRAME DCT

Field DCT

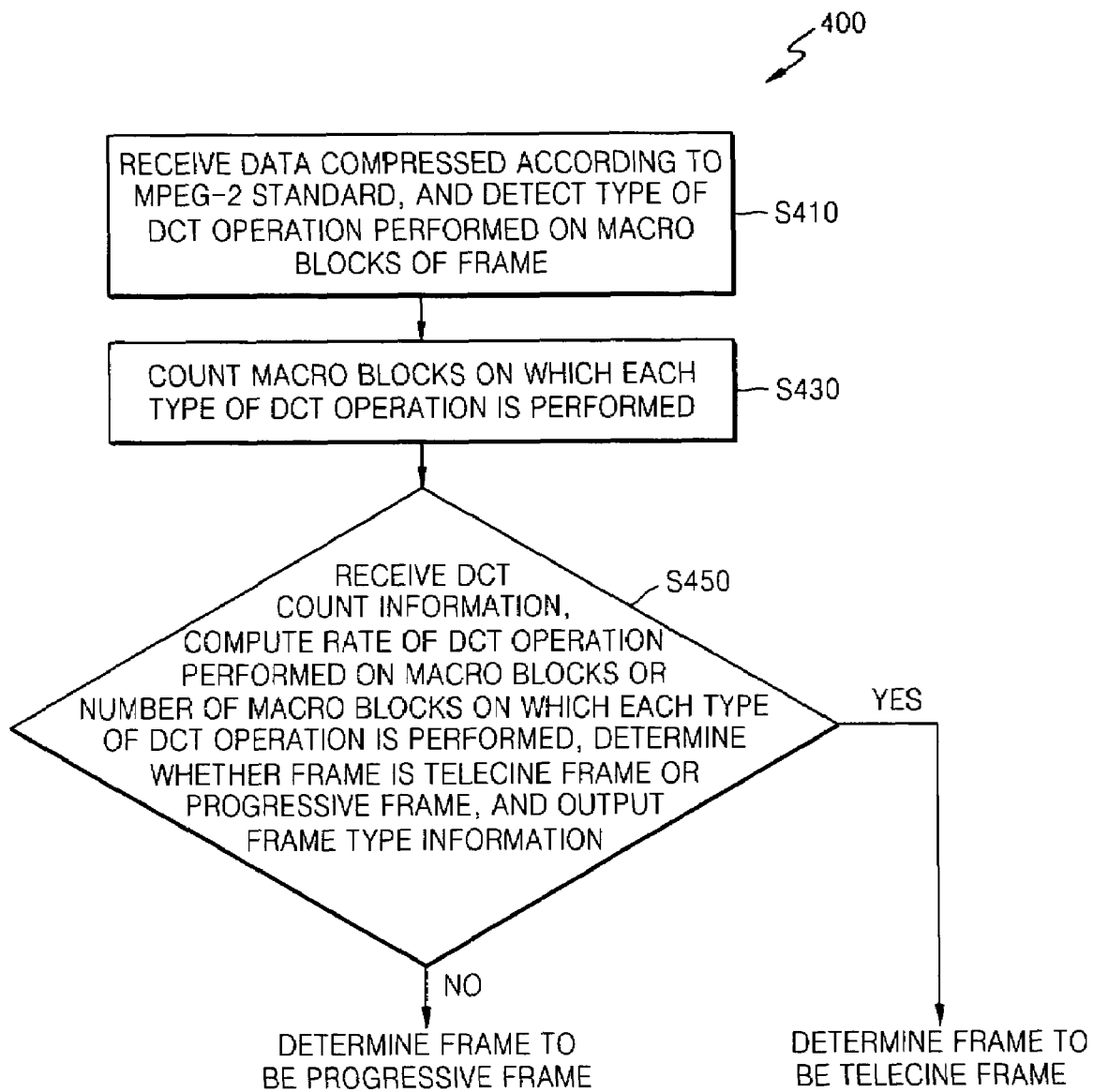

FRAME CONVERSION APPARATUS AND METHOD, AND FRAME TYPE DETECTION APPARATUS AND METHOD

PRIORITY STATEMENT

This application claims the priority of Korean Patent Application No. 10-2006-0073259, filed on Aug. 3, 2006, in the Korean Intellectual Property Office, the disclosure of which is incorporated herein in its entirety by reference.

BACKGROUND

1. Field

Example embodiments relate to a frame conversion apparatus and method and a frame type detection apparatus and method.

2. Description of the Related Art

A movie image may be displayed at a first number of frames per second, for example, 24 frames per second and a television (TV) image may be displayed at a second number of frames per second, for example, 30 frames per second. In order to broadcast a movie image in the form of a TV image, the frame rate of the movie image must be adjusted to conform with that of the TV image. Thus, a process known as "telecine" is used. Telecine is a process of making a new frame by duplicating some fields in order to convert an image of 24 frames per second into an image of 30 frames per second. For example, a movie image may include four frames for every ⅙ of a second, and a TV image may include five frames for every ⅙ of a second. Thus, in order to broadcast the movie image in the form of a TV image, a process of converting four frames into five frames, which is referred to as telecine, may be performed.

In telecine, new frames may be created from combinations of existing frames and used as converted frames. Also, some frames may be used directly as converted frames. New frames obtained from combinations of existing frames may be referred to as telecine frames, and frames used directly without being changed may be referred to as progressive frames.

Inverse telecine is a process in which telecine is performed in reverse. In order to perform inverse telecine, it must be determined whether frames on which inverse telecine is to be performed are telecine frames or progressive frames.

A TV broadcast station may compress frames, which are output through telecine, according to an MPEG-2 standard. Compression of the frames may include a Discrete Cosine Transform (hereinafter referred to as "DCT") operation. A DCT operation may be categorized into a field DCT operation and a frame DCT operation. A field DCT operation may be used on telecine frames and a frame DCT operation may be used on progressive frames. Thus, in order to decompress data compressed according to the MPEG-2 standard, the type of DCT operation used to compress the data must be determined. In order to determine the type of DCT operation used to compress the data, it must be determined whether the data frames are telecine frames or progressive frames.

Whether a target frame is a telecine frame or a progressive frame may be determined by computing a motion vector between the target frame and neighboring frames or performing a frequency analysis of the target frame. Therefore, in addition to a decompressing operation, additional operations must be further performed to compute a motion vector or perform the frequency analysis. Thus, calculators having a complicated structure are needed. Also, it may be difficult to determine whether frames are telecine frames in real time.

SUMMARY

Example embodiments provide a frame conversion apparatus and method capable of detecting the type of frame according to the type of Discrete Cosine Transform (DCT) operation performed on macro blocks of the frame.

Example embodiments provide an apparatus and method for detecting the type of frame according to the type of DCT operation performed on macro blocks of the frame.

According to example embodiments, there is provided an apparatus for converting a frame including a detecting unit determining whether each data frame is a telecine frame or a progressive frame according to at least one of a rate of a discrete cosine transform (DCT) operation type performed on macro blocks of the frame and a number of macro blocks on which each type of DCT operation is performed and outputting frame type information and an inverse telecine unit converting the data frames into progressive frames and outputting the progressive frames in response to the frame type information.

According to example embodiments, there is provided an apparatus for detecting a type of frame, including a discrete cosine transform (DCT) type detecting unit detecting a type of DCT operation performed on macro blocks present in each data frame, and outputting DCT type information, a counter receiving the DCT type information of the macro blocks, counting the number of macro blocks on which each type of DCT operation is performed, and outputting DCT count information, and a detecting unit determining whether each data frame is a telecine frame or a progressive frame according to at least one of a rate of a discrete cosine transform (DCT) operation type performed on macro blocks of the frame and a number of macro blocks on which each type of DCT operation is performed and outputting frame type information and an inverse telecine unit converting the data frames into progressive frames and outputting the progressive frames in response to the frame type information.

According to example embodiments, there is provided a method including detecting whether each data frame is a telecine frame or a progressive frame according to at least one of a rate of a discrete cosine transform (DCT) operation type performed on macro blocks of the frame and a number of macro blocks on which each type of DCT operation is performed, and outputting frame type information and performing a telecine operation in which the data frames are converted into progressive frames and the progressive frames are output in response to the frame type information.

According to example embodiments, there is provided a method including a discrete cosine transform (DCT) type detecting operation in which a type of DCT operation performed on macro blocks of each data frame is detected, and DCT type information is output, a counting operation in which the DCT type information of the macro blocks is received, the number of macro blocks on each type of DCT operation is performed, and DCT count information is output, and a frame type determining operation in which the DCT count information is received, a rate of DCT operation type performed on macro blocks of the frame or a number of macro blocks on which each type of DCT operation is performed is computed, whether the frame is a telecine frame or a progressive frame is determined, and the frame type information is output.

BRIEF DESCRIPTION OF THE DRAWINGS

Example embodiments will become more apparent by describing thereof with reference to the attached drawings in which:

FIG. 1A illustrates example frames on which telecine has yet to be performed and FIG. 1B illustrates example frames on which telecine has been performed;

FIG. 4 is a flowchart illustrating a detecting operation included in a frame conversion method according to example embodiments;

DETAILED DESCRIPTION OF EXAMPLE EMBODIMENTS

Figure 2A:
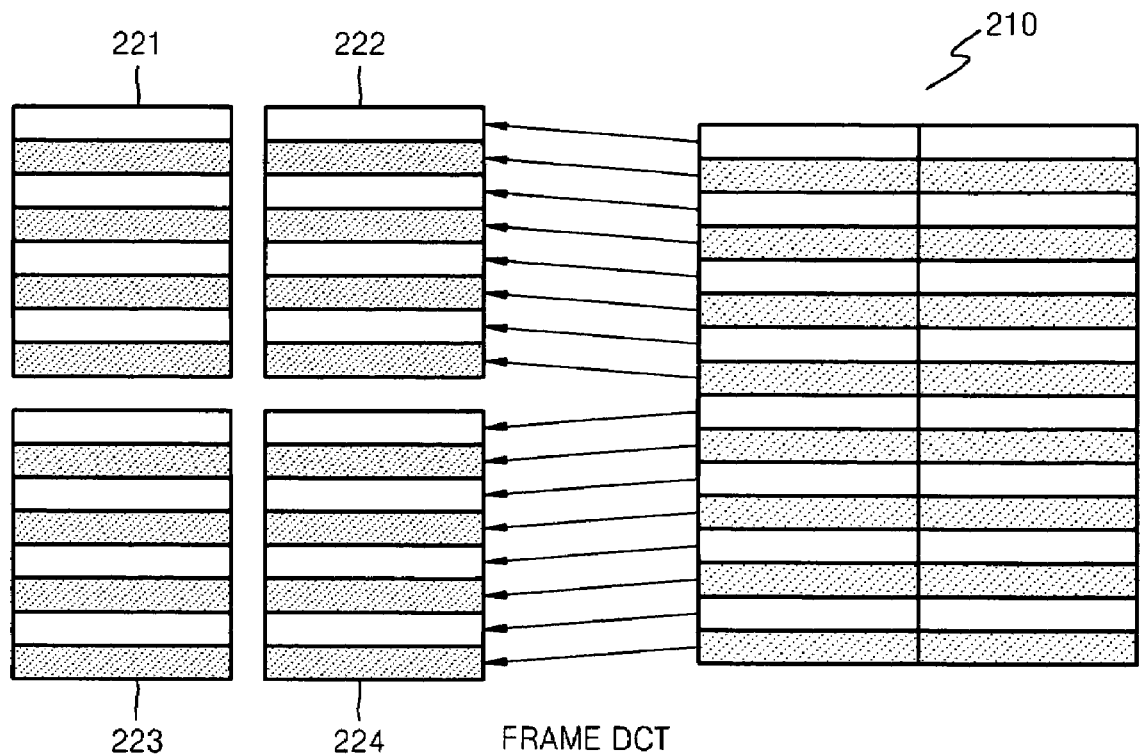
FIG. 2A is an example diagram illustrating a frame Discrete Cosine Transform (DCT) operation.

Hereinafter, example embodiments will be described in detail with reference to the accompanying drawings. In the drawings, the same or similar elements may be denoted by the same reference numerals even though they may be depicted in different drawings.

Example embodiments are described more fully hereinafter with reference to the accompanying drawings. Example embodiments may, however, be embodied in many different forms and should not be construed as limited to the embodiments set forth herein. Rather, example embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-section illustrations that are schematic illustrations. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the appended claims.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1A illustrates frames on which a telecine operation has yet to be performed, and FIG. 1B illustrates frames on which telecine has been performed.

A frame e.g., 101 may include upper fields and lower fields that are alternately located. For example, in a first frame 101 of FIG. 1A, a first upper field 101a, a first lower field 101b, a second upper field 101c, and a second lower field 101d may be sequentially arranged. Although not illustrated in FIG. 1A, the frame e.g., 101 may generally further includes a plurality of fields.

Referring to FIG. 1B, in telecine, the first frame 101, a third frame 103, and a fourth frame 104 of four frames that have yet to be converted, may be converted into a first frame 111, a fourth frame 114, and a fifth frame 115 of five converted frames, respectively. That is, the first frame 101, the third frame 103, and the fourth frame 104 may be converted by changing the locations thereof, not the fields thereof.

Also, in telecine, the second and third converted frames 112 and 113 may be generated by using the first through third frames 101 through 103 that have yet to be converted. For example, the converted second frame 112 is generated from combinations of the upper fields 101a and 101c of the first frame 101 and lower fields 102b and 102d of the second frame 102. The third frame 113 may be generated from combinations of upper fields 102a and 102c of the second frame 102 and lower fields 103b and 103d of the third frame 103. The second and third converted frames 112 and 113 may be telecine frames. Because a telecine frame may be generated from fields of a plurality of neighboring frames, a time difference may be present between two fields in a telecine frame.

As described above, the number of frames per second of a movie image may be changed by using telecine in order to broadcast the movie image in the form of a TV image. A broadcast station may compress the resultant converted image, for example, according to the MPEG-2 standard and broadcasts it to a TV. An image may be input to an MPEG-2 encoder, which compresses images according to the MPEG-2 standard, in frame units, each being comprised of upper fields and lower fields, not in field picture units, each being comprised of ones of upper fields and lower fields. Thus, the MPEG-2 encoder may compress the image in frame units according to the MPEG-2 standard.

A frame may be comprised of 16×16 macro blocks. The MPEG-2 encoder may perform both image compression and the Discrete Cosine Transform (DCT) operation on a 16×16 macro block basis. As described above, the DCT operation may be categorized into a frame DCT operation and a field DCT operation.

Figure 2B:
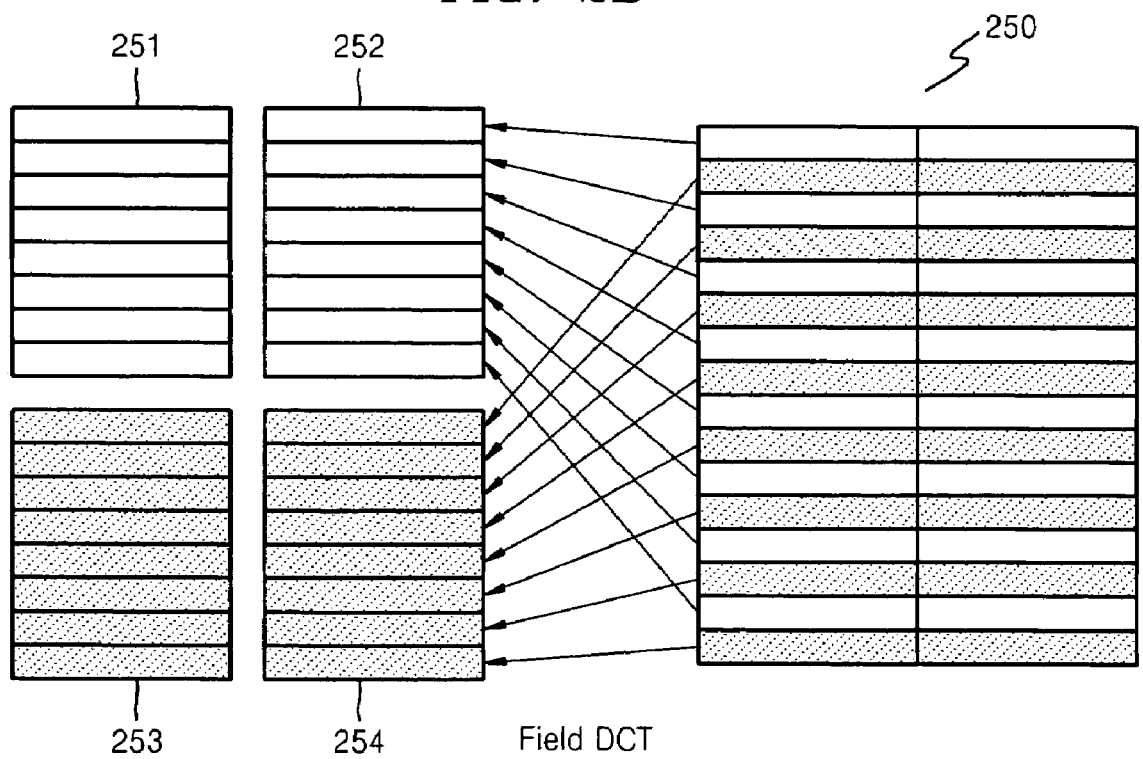
FIG. 2B is an example diagram illustrating a field DCT operation.

FIG. 2A is an example diagram illustrating a frame DCT operation. FIG. 2B is an example diagram illustrating a field DCT operation.

Referring to FIG. 2A, in the frame DCT operation, a 16×16 macro block 210 may be divided into four 8×8 macro blocks 221, 222, 223, and 224, and an 8×8 DCT operation may be performed thereon. The frame DCT operation may be performed on a macro block of a frame, for example, a progressive frame, in which a time difference is not present between an upper field and a lower field, e.g., a frame having a close relationship between an upper field and a lower field.

Referring to FIG. 2B, a field DCT operation may be performed by dividing a 16×16 macro block 250 into 8×8 macro blocks 251 and 252 having upper fields and 8×8 macro blocks 253 and 254 having lower fields, and performing the 8×8 DCT operation on the 8×8 macro blocks 251 through 254. The field DCT operation may be performed on a macro block of a frame, for example, a telecine frame, in which a time difference is present between an upper field and a lower field, e.g., a frame having a distant relationship between an upper field and a lower field.

Figure 3A:
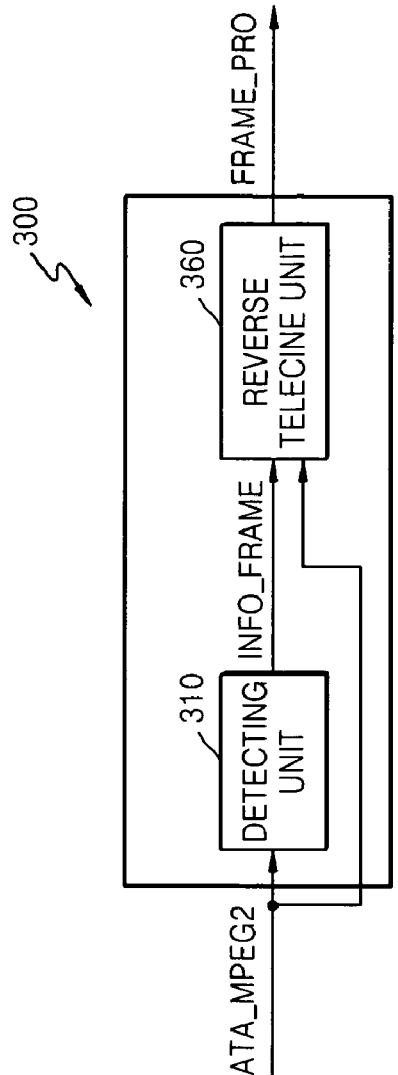
FIG. 3A is a block diagram of a frame conversion apparatus according to example embodiments.

FIG. 3A is a block diagram of a frame conversion apparatus 300 according to example embodiments. Referring to FIG. 3A, the frame conversion apparatus 300 may include a detecting unit 310 and/or an inverse telecine unit 360. The detecting unit 310 may determine whether each frame of data DATA_MPEG2 is a telecine frame or a progressive frame and output frame type information INFO_FRAME. For example, the detecting unit 310 may determine the type of each frame according to the rate of DCT operation types performed on macro blocks of the frame or the number of macro blocks on which each type of DCT operation is performed and output the frame type information INFO_FRAME. The inverse telecine unit 360 may convert the frames of the data DATA_MPEG2 into progressive frames FRAME_PRO and output the progressive frames FRAME_PRO in response to the frame type information INFO_FRAME.

The detecting unit 310 may determine whether each frame is a telecine frame or a progressive frame according to the rate of the field DCT operation performed on macro blocks of the frame or the number of macro blocks on which the field DCT operation is performed and output the frame type information INFO_FRAME.

The detecting unit 310 may determine that the frame is a telecine frame when the number of the macro blocks on which the field DCT operation is performed is equal to or greater than a reference number, otherwise, the frame is a progressive frame. The detecting unit 310 may determine that a frame is a telecine frame when the rate of the field DCT performed on macro blocks of the frame is equal to or greater than a reference ratio, otherwise, the frame is a progressive frame. The detecting unit 310 may determine whether the frame is a telecine frame or a progressive frame according to the rate of the frame DCT operation performed on the macro blocks of the frame or the number of the macro blocks on which the frame DCT operation is performed and output the frame type information INFO_FRAME.

The inverse telecine unit 360 may convert at least two telecine frames of the data DATA_MPEG2 into one progressive frame.

The data DATA_MPEG2 may be compressed according to the MPEG-2 standard.

Figure 3B:
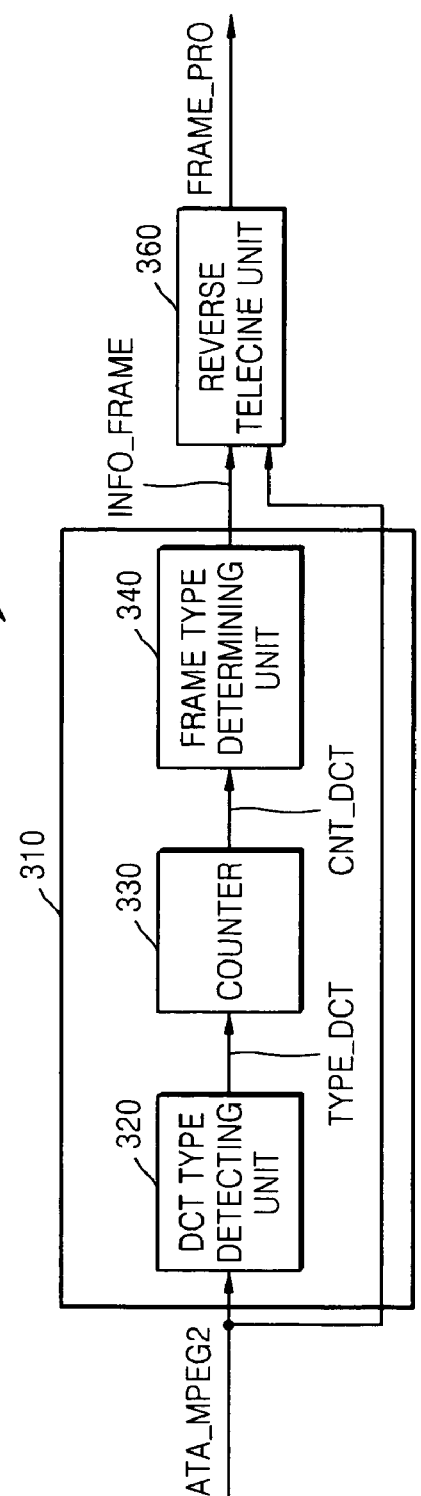
FIG. 3B is an example detailed block diagram of a detecting unit illustrated in FIG. 3A.

FIG. 3B is an example detailed block diagram of the frame conversion apparatus 300 illustrated in FIG. 3A. For example, FIG. 3B illustrates a detailed block diagram of the detecting unit 310 of the frame conversion apparatus 300. As illustrated in FIG. 3B, the detecting unit 310 may include a DCT type detecting unit 320, a counter 330 and/or a frame type determining unit 340. The DCT type detecting unit 320 may detect the type of DCT operation performed on macro blocks of a frame and outputs DCT type information TYPE_DCT.

A bitstream (data) compressed according to the MPEG-2 standard may contain a sequence header, a plurality of frames, and/or a sequence end. Each of the frames may contain a picture header and picture data, and the picture data may be comprised of a plurality of slices. Each of the slices may contain a plurality of macro blocks. Each of the macro blocks may include a macro block mode, a motion vector, and/or a data block. The macro block mode may include a macro block type field and/or a DCT type field. The DCT type field may assume a bit for each macro block.

Information may be input to the DCT type field when a macro block may include upper fields and lower fields, a time difference is not present between an upper field and a lower field, and the macro block is an intra block having no motion vector or the macro block has a pattern of 1. For example, a DCT of type 1 may mean that the field DCT operation may be performed on a macro block, and a DCT of type 0 may mean that the frame DCT operation may be performed on the macro block. The DCT type detecting unit 320 is capable of accessing the DCT type field included in the macro block mode in order to read the DCT type information TYPE_DCT.

The counter 330 may receive the DCT type information TYPE_DCT of macro blocks, count macro blocks on which each type of DCT operation is performed, and output DCT count information CNT_DCT. The frame type determining unit 340 may receive the DCT count information CNT_DCT, and compute the rate of the DCT operation type performed on the macro blocks of the frame or the number of the macro blocks on which each type of DCT operation is performed. The frame type determining unit 340 may determine whether the frame is a telecine frame or a progressive frame, and output the frame type information INFO_FRAME.

Figure 6:
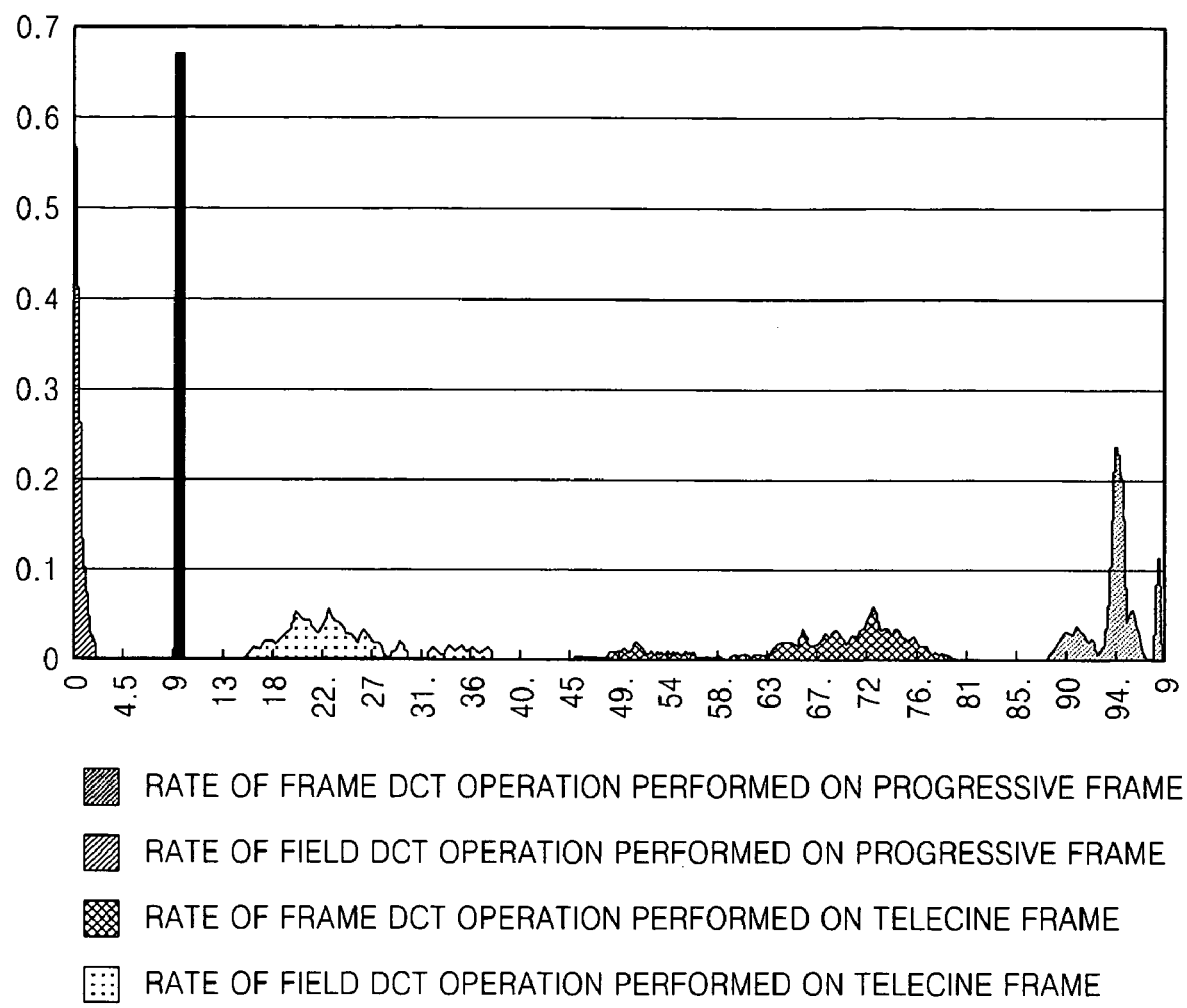
FIG. 6 is an example graph illustrating the rates of the field DCT operation and the frame DCT operation performed on both a telecine frame and a progressive frame.

FIG. 6 is a graph illustrating the rate of the field DCT operation and the frame DCT operation performed on a telecine frame and a progressive frame. Referring to FIG. 6, the rates of the frame DCT operation and the field DCT operation performed on macro blocks present in a telecine frame, are different from those of the frame DCT operation and the field DCT operation performed on macro blocks present in a progressive frame. For example, for a progressive frame, the rate of macro blocks on which the frame DCT operation was performed is greater than that of the macro blocks on which the field DCT operation was performed. For a telecine frame, the rate of macro blocks on which the field DCT operation was performed is greater than that of the macro blocks on which the frame DCT operation was performed.

Based on experimental values and/or statistical values illustrated in the graph of FIG. 6, the frame conversion apparatus 300 according to example embodiments may be capable of setting a basis for determining whether a received frame is a telecine frame or a progressive frame.

A frame type detecting apparatus e.g., 310 of FIG. 3 according to example embodiments may include a DCT type detecting unit, a counter, and/or a frame type determining unit. The DCT type detecting unit may detect the type of DCT operation performed on macro blocks in each data frame, and output DCT type information. The counter may receive the DCT type information of the macro blocks of each frame, count macro blocks on which each type of DCT operation is performed, and output DCT count information. The frame type determining unit may receive the DCT count information, compute the rate of DCT operation type performed on macro blocks present in each frame or the number of the macro blocks on which each type of DCT operation is performed, determine whether each frame is a telecine frame or a progressive frame, and output frame type information.

The technical concept and construction of the frame type detecting apparatus are similar to those of the detecting unit 310 illustrated in FIG. 3B. Therefore, those of ordinary skill in the art may easily understand the frame type detecting apparatus based on the above description of the detecting unit 310, and thus, a detailed description thereof will be omitted.

Figure 5:
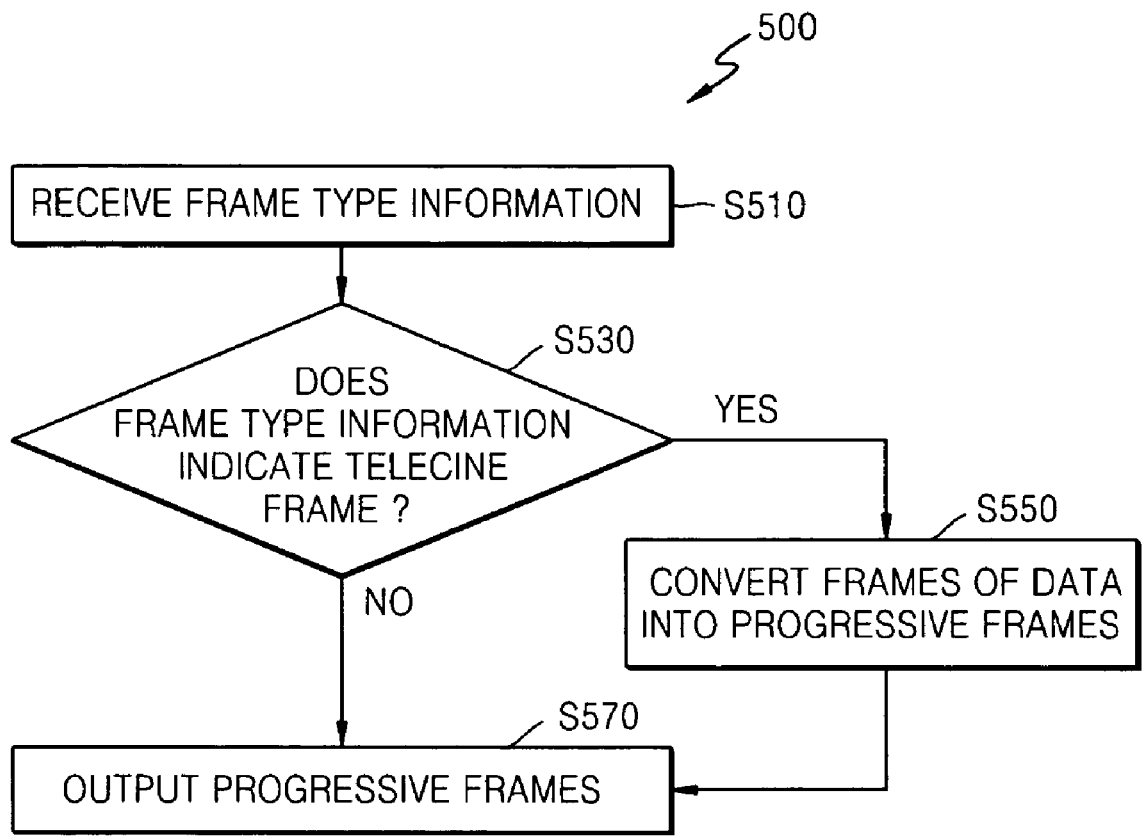
FIG. 5 is a flowchart illustrating an inverse telecine operation included in a frame conversion method according to example embodiments n.

FIG. 4 is a flowchart illustrating a detecting operation 400 included in a frame conversion method according to example embodiments. FIG. 5 is a flowchart illustrating an inverse telecine operation 500 included in a frame conversion method according to example embodiments.

Referring to FIGS. 4 and 5, the frame conversion method according to example embodiments may include the detecting operation 400 and/or the inverse telecine operation 500. In the detecting operation 400, whether each data frame is a telecine frame or a progressive frame may be determined according to the rate of DCT operation type performed on macro blocks present in the frame and/or the number of the macro blocks on which each type of DCT operation is performed, and then frame type information may be output. In the inverse telecine operation 500, the data frames may be converted into progressive frames and the progressive frames may be output in response to the frame type information.

For example, the detecting operation 400 may include detecting the type of DCT operation performed on the macro blocks of the frame and outputting the DCT type information (operation S410), receiving the DCT type information of the macro blocks, counting the macro blocks on which each type of DCT operation may be performed, and outputting DCT count information (operation S430), and receiving the DCT count information, computing the ratio of DCT operation type performed on macro blocks in the frame or the number of the macro blocks on which each type of DCT operation is performed, determining whether the frame is a telecine frame or a progressive frame, and outputting the frame type information (operation S450). In operation S450, the frame may be determined to be a telecine frame when the number of macro blocks on which the field DCT operation may be performed is equal to or greater than a reference number, and may otherwise be determined to be a progressive frame.

The inverse telecine operation 500 may include receiving the frame type information (operation S510), and determining which frame is indicated by the frame type information (operation S530). When it is determined in operation S530 that the frame type information indicates a telecine frame, the data frames may be converted into progressive frames (operation S550), and the progressive frames may be output (operation S570). When it is determined in operation S530 that the frame type information indicates a progressive frame, the data frames may be output directly without change (operation S570).

A frame type detecting method according to example embodiments may include a DCT type detecting operation, a counting operation, and/or a frame type determining operation. In the DCT type detecting operation, the type of DCT operation performed on macro blocks of each data frame may be detected, and DCT type information may be output. In the counting operation, the DCT type information of the macro blocks may be received, the number of macro blocks on which each DCT operation may be counted, and DCT count information may be output. In the frame type determining operation, the DCT count information may be received, the rate of DCT operation type performed on the macro blocks of the frame or the number of macro blocks on each type of DCT operation may be performed may be computed, whether the frame is a telecine frame or a progressive frame may be determined, and frame type information may be output.

A frame conversion method and a frame type detecting method according to example embodiments may correspond to the above-described frame conversion apparatus and the above frame type detecting apparatus, respectively, in terms of their technical concepts and constructions. Accordingly, those of ordinary skill in the art may easily understand the frame conversion method and the frame type detecting method from the above descriptions, and therefore, a detailed description thereof will be omitted.

As described above, according to frame conversion apparatus and methods and frame type detecting apparatus and methods according to example embodiments, it is possible to detect the type of frame according to the number of macro blocks on which each type of DCT operation is performed, thereby detecting the type of frame in real time.

While example embodiments have been particularly shown and described, it will be understood by those skilled in the art that various changes in form and details may be made therein without departing from the spirit and scope of the invention as defined by the appended claims.

What is claimed is:

1. An apparatus for converting a frame, comprising:
   a detecting unit determining whether each data frame is a telecine frame or a progressive frame according to a number of macro blocks on which each type of DCT operation is performed and outputting frame type information; and
   an inverse telecine unit converting the data frames into progressive frames and outputting the progressive frames, in response to the frame type information,
   wherein the detecting unit determines whether each of the frames is a telecine frame or a progressive frame according to the number of macro blocks on which the field DCT operation is performed and outputting the frame type information,
   wherein the detecting unit determines that the frame is a telecine frame when the number of macro blocks on which the field DCT operation is performed is equal to or greater than a reference number, otherwise the frame is a progressive frame.

2. The apparatus of claim 1, wherein the detecting unit determines whether the frame is a telecine frame or a progressive frame according to at least one of a rate of a frame DCT operation performed on the macro blocks of the frame and a number of macro blocks on which the frame DCT operation is performed, and outputting the frame type information.

3. The apparatus of claim 1, wherein the detecting unit comprises:
   a DCT type detecting unit detecting a type of DCT operation performed on the macro blocks of the frame, and outputting DCT type information;
   a counter receiving the DCT type information of the macro blocks, counting the number of macro blocks on which each type of DCT operation is performed, and outputting DCT count information; and
   a frame type determining unit receiving the DCT count information, computing the number of macro blocks on which the DCT operation is performed, determining whether the frame is a telecine frame or a progressive frame, and outputting the frame type information.

4. The apparatus of claim 1, wherein the inverse telecine unit converts the data frames into progressive frames and outputs the progressive frames when the frame type information indicates a telecine frame, and directly outputs the data frames when the frame type information indicates a progressive frame.

5. The apparatus of claim 1, wherein the inverse telecine unit converts at least two telecine data frames into one progressive frame.

6. The apparatus of claim 1, wherein the data is compressed according to an MPEG-2 standard.

7. An apparatus for detecting a type of frame, comprising:
   a discrete cosine transform (DCT) type detecting unit detecting a type of DCT operation performed on macro blocks present in each data frame, and outputting DCT type information;
   a counter receiving the DCT type information of the macro blocks, counting the number of macro blocks on which each type of DCT operation is performed, and outputting DCT count information; and
   a frame type determining unit receiving the DCT count information, computing a number of macro blocks on which each type of DCT operation is performed, determining whether the frame is a telecine frame or a progressive frame, and outputting the frame type information;
   wherein the frame type determining unit determines whether the frame is a telecine frame or a progressive frame according to the number of blocks on which the field DCT operation is performed, and outputs frame type information;
   wherein the frame type determining unit determines that the frame is a telecine frame when the number of macro blocks on which the field DCT operation is performed is equal to or greater than a reference number, otherwise the frame is a progressive frame.

8. The apparatus of claim 7, wherein the data is compressed according to an MPEG-2 standard.

9. A method, comprising:
   detecting whether each data frame is a telecine frame or a progressive frame according to a number of macro blocks on which each type of DCT operation is performed, and outputting frame type information; and
   performing a telecine operation in which the data frames are converted into progressive frames and the progressive frames are output in response to the frame type information;
   wherein, in the detecting, whether the frame is a telecine frame or a progressive frame is determined according to the number of macro blocks on which the field DCT operation is performed, and the frame type information is output;
   wherein, in the detecting, the frame is determined to be a telecine frame when the number of the macro blocks on which the field DCT operation is performed is equal to or greater than a reference number, otherwise the frame is determined to be a progressive frame.

10. The method of claim 9, wherein the detecting comprises:
    detecting a type of DCT operation performed on the macro blocks of the frame and outputting DCT type information;
    receiving the DCT type information of the macro blocks, counting the number of macro blocks on which each type of DCT operation is performed, and outputting DCT count information; and
    receiving the DCT count information, computing a number of the macro blocks on which each type of DCT operation is performed, determining whether the frame is a telecine frame or a progressive frame, and outputting the frame type information.

11. The method of claim 9, wherein, in the inverse telecine operation, the data frames are converted into progressive frames when the frame type information indicates a telecine frame, and the data frames are directly output when the frame type information indicates a progressive frame.

12. The method of claim 9, wherein the data is compressed according to an MPEG-2 standard.

13. A method of detecting a type of frame, comprising:
    a discrete cosine transform (DCT) type detecting operation in which a type of DCT operation performed on macro blocks of each data frame is detected, and DCT type information is output;
    a counting operation in which the DCT type information of the macro blocks is received, the number of macro blocks on each type of DCT operation is performed, and DCT count information is output; and
    a frame type determining operation in which the DCT count information is received, a number of macro blocks on which each type of DCT operation is performed is computed, whether the frame is a telecine frame or a progressive frame is determined, and the frame type information is output;
    wherein, in the frame type determining operation, whether the frame is a telecine frame or a progressive frame is determined according to the number of the macro blocks on which the field DCT operation is performed, and the frame type information is output;
    wherein, in the frame type determining operation, the frame is determined to be a telecine frame when the number of the macro blocks on which the field DCT operation is performed is equal to or greater than a reference number, otherwise the frame is determined to be a progressive frame.

* * * * *